United States Patent [19]

Tomita

[11] Patent Number: 5,446,717
[45] Date of Patent: Aug. 29, 1995

[54] OPTICAL DISC AND RECORDING AND REPRODUCING METHOD FOR AN OPTICAL DISC WITH A HIGH DENSITY

[75] Inventor: Yoshimi Tomita, Saitama, Japan

[73] Assignee: Pioneer Electronic Corporation, Tokyo, Japan

[21] Appl. No.: 144,358

[22] Filed: Nov. 1, 1993

[30] Foreign Application Priority Data

Nov. 5, 1992 [JP] Japan .................................. 4-295670

[51] Int. Cl.$^6$ ............................................ G11B 7/00
[52] U.S. Cl. .......................................... 369/58; 369/54; 369/124
[58] Field of Search ............... 369/275.1, 275.3, 275.4, 369/44.26, 44.11, 47, 54, 58, 124, 59, 44.41, 111

[56] References Cited

U.S. PATENT DOCUMENTS

| | | | |
|---|---|---|---|
| 4,811,321 | 3/1989 | Enari et al. ........................ | 369/59 |
| 5,166,914 | 11/1992 | Shimada et al. ............ | 369/44.26 X |
| 5,206,853 | 4/1993 | Tanaka .................................. | 369/54 |
| 5,280,466 | 1/1994 | Tomita ........................... | 369/275.1 |
| 5,321,519 | 6/1994 | Akiyama ...................... | 369/124 X |

*Primary Examiner*—W. R. Young
*Assistant Examiner*—Thang V. Tran
*Attorney, Agent, or Firm*—Nikaido Marmelstein Murray & Oram

[57] ABSTRACT

A recording signal y(n,t) is recorded on a track $T_n$ of an optical disc in accordance with a following equation, $$y(n,t) -= y(n-1,t) + x(n,t)$$

where $y(n-1,t)$ is a previous signal recorded on an adjacent track $T_{n-1}$, $x(n,t)$ is an original signal for a track $T_n$, t is time, and + is a symbol expressing the exclusive or operation.

2 Claims, 7 Drawing Sheets

| ADJACENT SIGNAL y(n-1) | ORIGINAL SIGNAL x(n) | RECORDING SIGNAL y(n) | REPRODUCED SIGNAL R(n) | DETERMINED SIGNAL R'(n) |
|---|---|---|---|---|
| 1 | 1 | 0 | 1 | 1 |
| 1 | 0 | 1 | 2 | 0 |
| 0 | 0 | 0 | 0 | 0 |
| 1 | 1 | 0 | 1 | 1 |
| 0 | 1 | 1 | 1 | 1 |
| 1 | 1 | 0 | 1 | 1 |
| 1 | 0 | 1 | 2 | 0 |
| 0 | 1 | 1 | 1 | 1 |
| 0 | 1 | 1 | 1 | 1 |
| 1 | 1 | 0 | 1 | 1 |
| 0 | 0 | 0 | 0 | 0 |
| 1 | 0 | 1 | 2 | 0 |
| 1 | 0 | 1 | 2 | 0 |

| Zt | Yt | xt | Xt | R(n) | R'(n) |
|---|---|---|---|---|---|
| 0 | 0 | 0 | 0 | 0 | 0 |
| 0 | 0 | 1 | 1 | 1 | 1 |
| 1 | 0 | 1 | 0 | 1 | 1 |
| 1 | 0 | 0 | 1 | 2 | 0 |
| 0 | 1 | 1 | 0 | 3 | 1 |
| 0 | 1 | 0 | 1 | 4 | 0 |
| 1 | 1 | 0 | 0 | 4 | 0 |
| 1 | 1 | 1 | 1 | 5 | 1 |

OPTICAL DISC AND RECORDING AND REPRODUCING METHOD FOR AN OPTICAL DISC WITH A HIGH DENSITY

BACKGROUND OF THE INVENTION

The present invention relates to an optical disc and a method for recording data on the optical disc at a high density, and reproducing information dependent on the data, and a system for carrying out the method.

There has been proposed various ways to increase the density of pits formed on the optical disc. For example, the distance between the pits on the track is decreased, or the diameter of a laser beam which records and reads information is constricted.

Another method is to decrease the pitches between the tracks. However, if the diameter of a beam spot formed by the laser beam on the optical disc is not decreased, data recorded on the adjacent tracks are also reproduced, so that crosstalk occurs. In order to reproduce the correct information, there has been proposed a system for eliminating the crosstalk. Namely, three adjacent tracks are simultaneously read with three light beams. Signals produced from the side tracks are subtracted from a signal produced from the central track, thus cancelling the crosstalk.

More particularly, Japanese Patent Application 3-40225 Laid-Open discloses a system having a frequency-variable filter. The frequency is set at a value where the crosstalk is most effectively eliminated.

There has also been proposed a system wherein a cancelling coefficient is obtained so that correlations between the signals produced from the adjacent tracks are eliminated. For details, refer to pages 98 to 99 of Nikkei Electronics, Nikkei BP, No. 495, Mar. 19, 1991.

However, in the above-described reproducing systems, a signal corresponding to the crosstalk is produced from the adjacent tracks to cancel the crosstalk. Hence the tracks must be irradiated with a plurality of beams. Moreover, the frequency-variable filter is required in the first example. In the second example, a circuit for producing a reference signal which corresponds to a preamble signal recorded on the optical disc, and a detecting circuit for detecting the difference between the reference signal and the preamble signal are necessary. Thus, the systems become complicated in construction.

SUMMARY OF THE INVENTION

An object of the present invention is to provide a method for recording data on an optical medium at a high density and reproducing the recorded data.

Another object of the present invention is to provide a recording and reproducing system for the optical disc in accordance with the method.

According to the present invention there is provided an optical disc having a plurality of tracks, comprising a signal y(n,t) being recorded on a track $T_n$ of the disc in accordance with the following equation, $$y(n,t) = y(n-1,t) + x(n,t)$$

where y(n−1,t) is a previous signal recorded on an adjacent track $T_{n-1}$, x(n,t) is an original signal for a track $T_n$, t is time, and + is a symbol expressing the exclusive or operation.

The present invention further provides a recording and reproducing method for an optical disc having a plurality of tracks, comprising, storing a previous signal recorded on at least one track adjacent to an instant track on which a recording signal is to be recorded, performing an exclusive or operation of the stored previous signal and an original signal thereby to produce a recording signal, recording the recording signal at a position corresponding to a position where the previous signal is recorded, radiating a light beam to the instant track and the adjacent track to form a spot on recorded positions of the previous signal and the recording signal to produce a reproduced signal having a level dependent on conditions of the recorded positions, and determining a level of the original signal from the level of the reproduced signal.

Other objects and features of this invention will become understood from the following description with reference to the accompanying drawings.

DETAILED DESCRIPTION OF THE PREFERRED EMBODIMENT

The principle of the present invention will be described hereinafter with reference to FIGS. 1 and 2.

Figure 1:
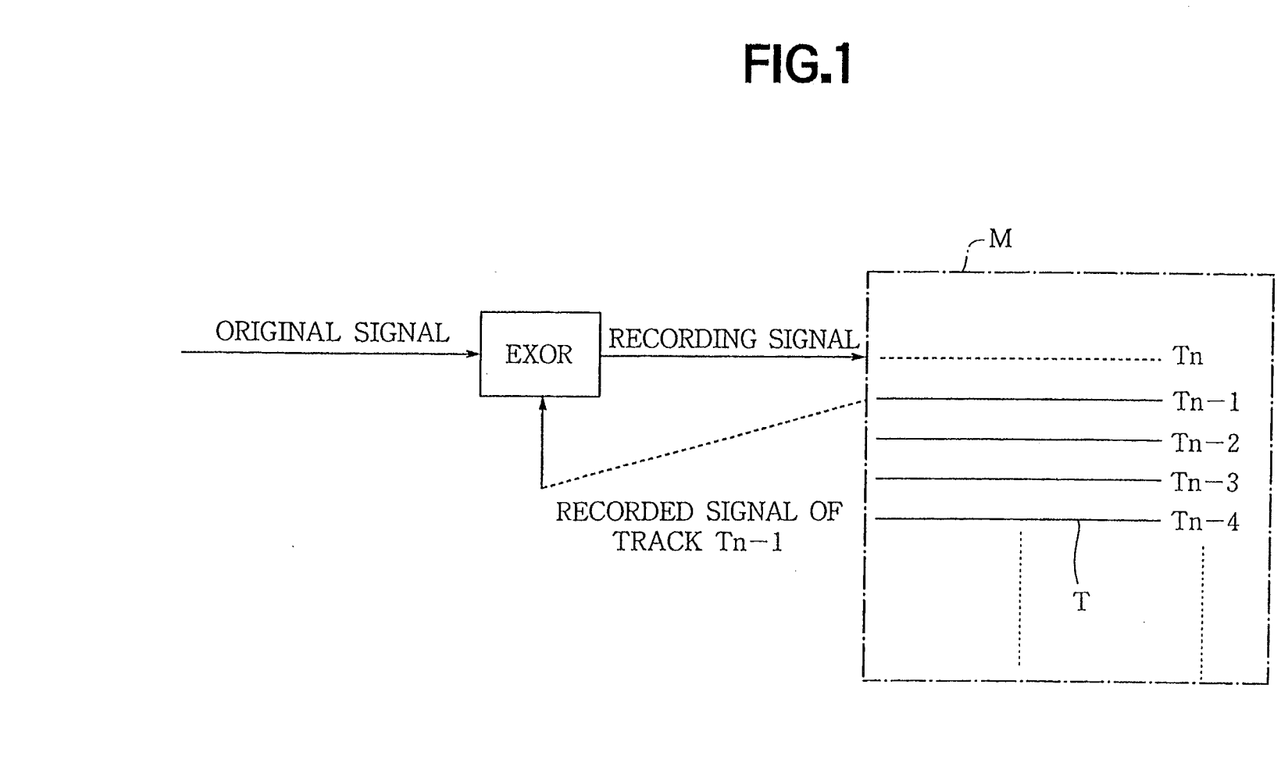
FIG. 1 is a diagram explaining a principle of a method for recording data in accordance with the present invention.

Referring to FIG. 1, a recording medium M has a plurality of tracks $T_n$, $T_{n-1}$, $T_{n-2}$ (n is a natural number) on which data are recorded. The recording of data on the track $T_n$ is performed at a recording timing, based on the exclusive or operation (EXOR) of an original data to be recorded on the track $T_n$ and previous data already recorded on an adjacent inner track $T_{n-1}$. The previous data is stored in a memory buffer. Namely, data signal y(n,t) to be actually recorded on the track $T_n$ is expressed as follows.

$$y(n,t) = y(n-1,t) + x(n,t)$$

where y(n−1,t) is the previous signal recorded on the adjacent track $T_{n-1}$, x(n,t) is the original signal for the track $T_n$, t is time, and + is a symbol expressing the exclusive or operation. The calculated signal y(n,t) is recorded on the track $T_n$ at a position corresponding to a position where the previous signal is recorded. The memory buffer may store data for only one track at a time and be rewritten each time new data is calculated. The memory buffer may also store data for a plurality of tracks, so that the recording data is calculated therein and outputted one at a time.

As shown in FIGS. 2a and 2b, when reproducing the data from the track $T_n$, light emitting means 2 of a reproducing device 1 emits a beam which forms a beam spot S on pits P of the two tracks $T_n$ and $T_{n-1}$. A light receiving means 3 recieves the reflected beam and applies a signal corresponding to the intensity of the detected beam to a determining means 4. The determining means 4 determines the level of the intensity signal, that is whether it is at a low level L, medium level M, or a high level H. The determining means 4 further produces a binary signal which coincides with the original data based on the detected level.

Figure 3:
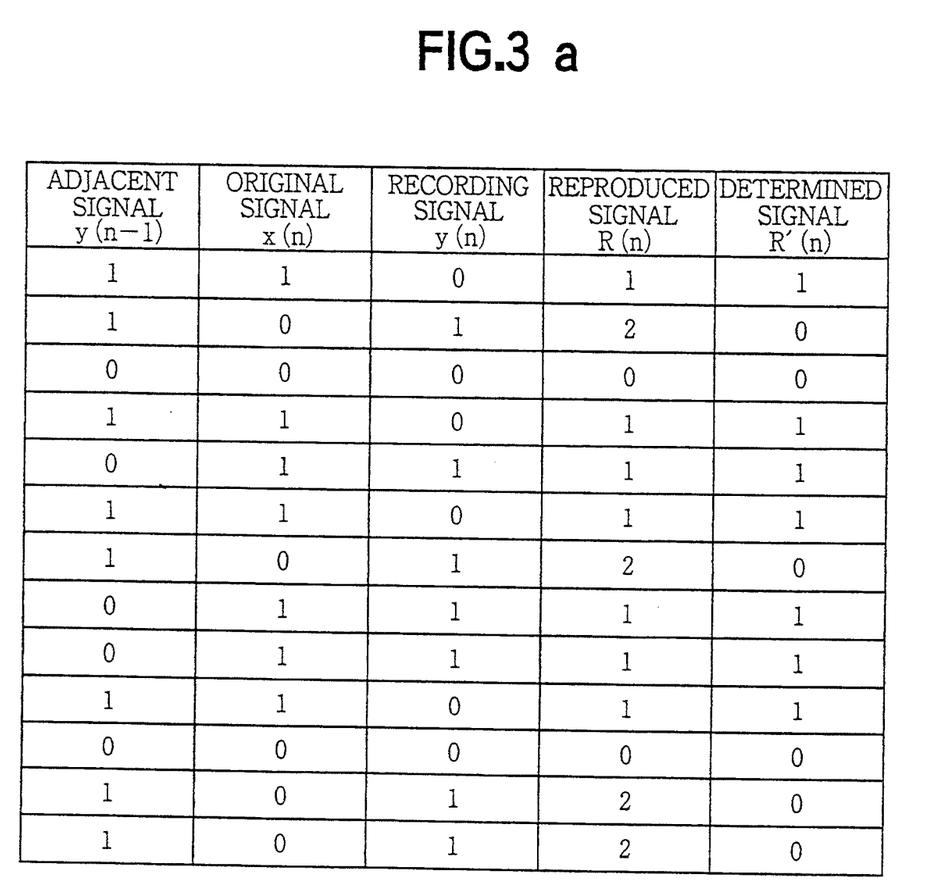
FIG. 3a is a table showing relationship between levels of signals of adjacent tracks and detected data signal.
FIG. 3b is a graph showing a signal reproduced from adjacent tracks.

FIG. 3a shows levels of an adjacent signal $y(n-1)$ stored in the memory for the adjacent track $T_{n-1}$, original signal $x(n)$ for the track $T_n$, recording signal $y(n)$ actually recorded on the track $T_n$ which is obtained by the exclusive or operation of the signals $y(n-1)$ and $x(n)$, reproduced signal $R(n)$ reproduced from reading the tracks $T_n$ and $T_{n-1}$, and a determined signal $R'(n)$ determined dependent on the reproduced signal $R(n)$.

In the example of FIG. 3a, the level "1" in the columns of the adjacent signal $y(n-1)$ and of the recording signal $y(n)$, means that no pit is formed on the disc. Thus all of the light beam for reproducing a signal is reflected. On the other hand, the level "0" means that a pit is formed, so that a quantity of light reflected from the disc is decreased, due to the diffraction thereof.

For example, as shown in the first row of the table in FIG. 3a, when the level of the adjacent signal $y(n-1)$ of the adjacent track $T_{n-1}$ is "1" and the level of the original signal $x(n)$ is "1", a "0" level signal $y(n)$ for the track $T_n$ is obtained as a result of the exclusive or operation. Therefore a pit is recorded on the track $T_n$. When a beam for producing the original signal $x(n)$ is applied on the tracks $T_n$ and $T_{n-1}$, since the track $T_{n-1}$ has no pit, the level of the reproduced signal $R(n)$ is "1". Namely, the reproduced signal is at the medium level M as shown in FIG. 3b. As a result, the determining means 4 produces a signal $R'(n)$ at a level "1", which is the same as that of the original signal $x(n)$.

As shown in the second row, when the level of the signal $y(n-1)$ is "1" and the level of the original signal $x(n)$ is "0", the level "1" is recorded on the track $T_n$. When the tracks $T_n$ and $T_{n-1}$ are applied with the light beam, each of the tracks reflects a large quantity of light, thereby generating a signal $R(n)$ of a high level, namely at a level 2 as shown in FIG. 3b. The determining means 4 then produces a signal $R'(n)$ having a level "0".

When the levels of the signals $y(n-1)$ and $x(n)$ are "0" as shown in the third row of the table, the recorded level of the signal $y(n)$ is "0". Since diffraction of the beam becomes large, only a low level signal is reproduced. The determining means 4 accordingly produces the "0" level $R'(n)$ signal.

Describing the reproduced signal in detail, the signal $R(n)$ reproduced from the tracks $T_n$ and $T_{n-1}$ is expressed as $$R(n) = y(n) + y(n-1)$$

Since the detected signal $R'(n)$ determined dependent on the level of the reproduced signal $R(n)$ is an equivalent of the exclusive or of the signals $y(n)$ and $y(n-1)$, the signal $R'(n)$ is expressed as follows.

$$R' = y(n) + y(n-1) \quad (1)$$

Since $$y(n) = x(n) + y(n-1),$$

when $y(n)$ in equation (1) is substituted by the above equation, the signal $R'(n)$ is further expressed as, $$\begin{aligned} R'(n) &= x(n) + y(n-1) + y(n-1) \\ &= x(n) + y(n-1) + y(n-1) \\ &= x(n) + 0 \\ &= x(n) \end{aligned}$$

Namely, the detected signal $R'(n)$ is the same as the original signal $x(n)$.

Figure 4:
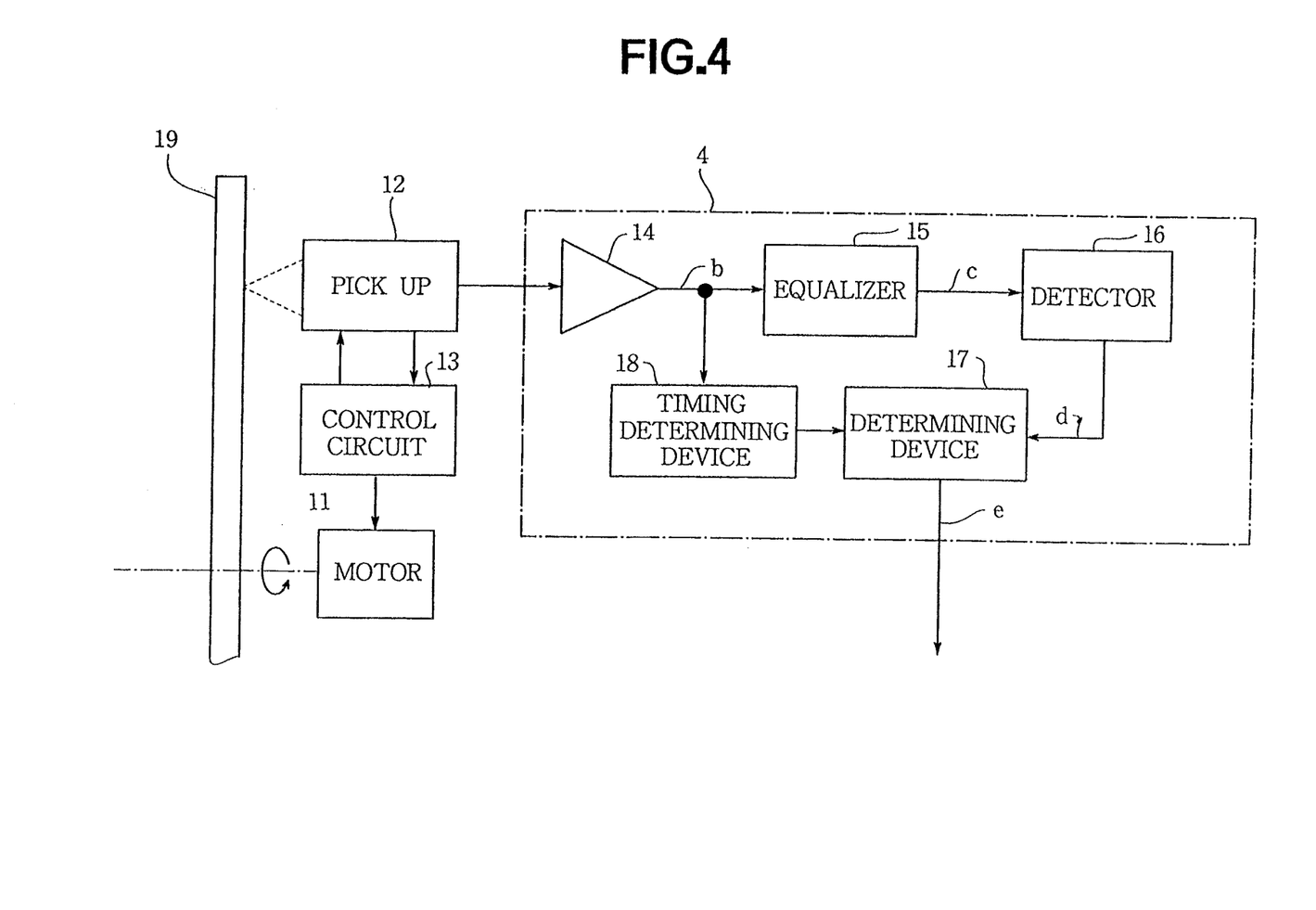
FIG. 4 is a block diagram of a reproducing system of the present invention.

Referring to FIG. 4, a reproducing system for reproducing a recorded data from an optical disc 19 comprises a pickup 12 having an optical system for emitting and receiving light beams and servo systems, control circuit 13 for controlling the pickup 2, and a spindle motor 11 for rotating the disc 19 in accordance with a signal from the control circuit 13. The pickup 12 has the light emitting means 2, shown in FIG. 2, which emits a light beam. The light beam forms a beam spot S, the center of which is controlled to trace the center line between the tracks $T_n$ and $T_{n-1}$. The light receiving means 3 of FIG. 2 is further provided in the pickup 12 to receive the reflected beam and to produce the reproduced signal, focus error signal, tracking error signal and rotating error signal.

Figure 2:
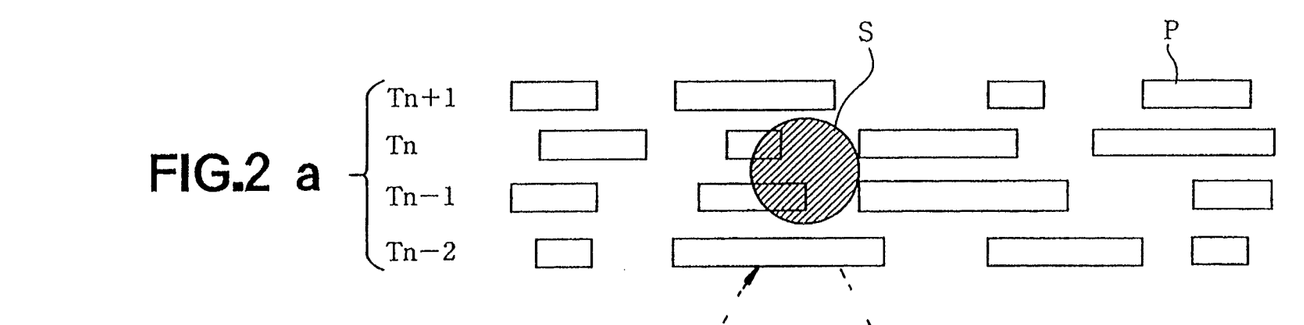
FIGS. 2a and 2b are diagrams explaining a principle of a reproducing method in accordance with the present invention.
Figure 5:
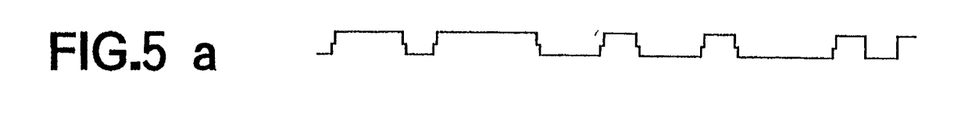
FIGS. 5a to 5f show various waveform of the reproduced signal while being processed in the system of FIG. 4.

The reproduced signal is fed to an amplifier 14 of the determining means 4, which is also described in FIG. 2. An amplified reproduced signal b shown in FIG. 5b is amplified and fed to an equalizer 15, so that signals in a high frequency range are further amplified as shown in FIG. 5c. The output signal c of the equalizer 15 is applied to a detector 16, so as to be rectified as shown in FIG. 5d. The rectified signal d is further applied to a determining device 17 to which is fed a signal from a timing determining device 18. The timing determining device 18 generates a timing signal in accordance with the output signal b of the amplifier 14. Hence, the determining device 17 produces a binary signal e dependent on the output signal d from the detector 16 at an appropriate timing. Namely, the determining device 17 generates a high-level signal ("1") when the level of the signal d is low or high, and a low level signal ("0") when the level of the signal d is medium. The signal e in FIG. 5e is inverted as shown in FIG. 5f, so as to have the same waveform as the original signal shown in FIG. 5a. The original signal a is thus reproduced.

In the present embodiment, a beam spot having the same diameter as that of a conventional system is focused on two tracks at the same time to reproduce data. Thus, the recording density of the disc can be doubled.

The present invention may be modified to produce a recording data for the track $T_n$ from the data recorded on adjacent tracks $T_{n-1}$ and $T_{n-2}$ and the original data. The original data is reproduced by radiating the three tracks $T_n$, $T_{n-1}$, and $T_{n-2}$ at the same time. In the embodiment, a recording data $X_t$ for the track $T_n$ is expressed as $$X_t = x_t + Y_t + Z_t$$

where Yt and Zt are data recorded on the inner track $T_{n-1}$ adjacent the track $T_n$ and the further inner track $T_{n-2}$ adjacent the track $T_{n-1}$, and t is time.

Figure 6:
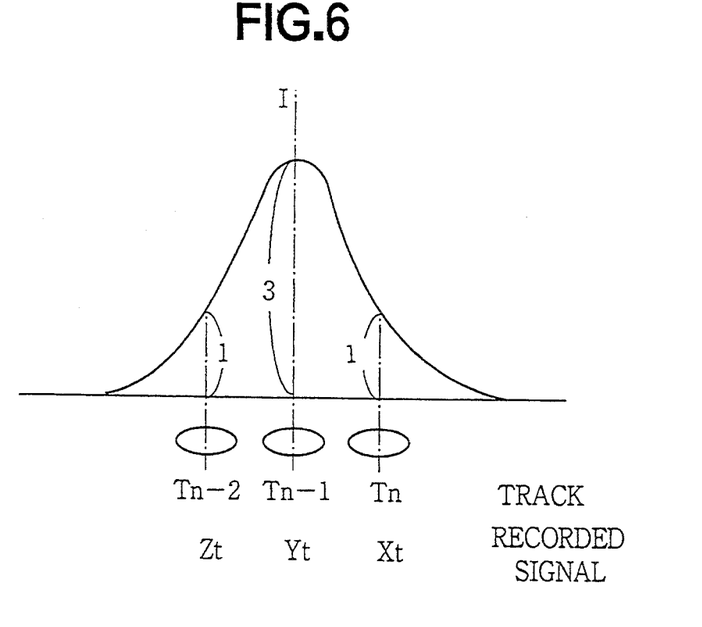
FIG. 6 is an illustration explaining intensities of light radiated on tracks in a second embodiment of the present invention.

The beam spot for reading the recording medium is focused on the three tracks $T_n$, $T_{n-1}$, and $T_{n-2}$ to reproduce the original data xt. As shown in FIG. 6, the beam spot of the present embodiment has a higher intensity I at the center and a lower intensity at the periphery. That is to say, the track $T_{n-1}$ is irradiated with an intensity three times as large as that of the tracks $T_n$ and $T_{n-2}$.

Figure 7:
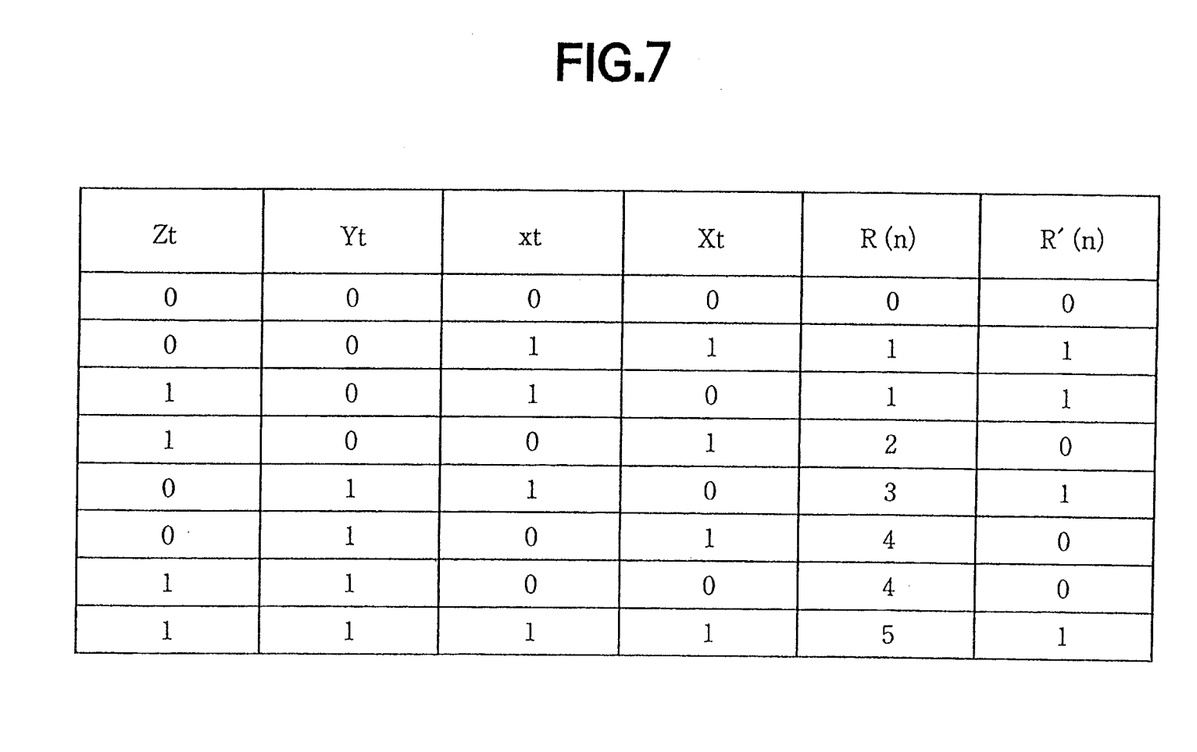
FIG. 7 is a table showing relationship between levels of signals of adjacent tracks and detected data signal in the second embodiment.

The operation of the present embodiment will now be described with reference to FIG. 7.

When levels of the signal Zt, Yt of tracks $T_{n-2}$ and $T_{n-1}$ and the original signal xt are all "0", the level "0" is recorded on the track $T_n$. When the beam is applied to the tracks $T_n$, $T_{n-1}$ and $T_{n-2}$, the level of the reproduced signal R(n) is 0.

If the level of the original signal xt is "1" while the signals Zt and Yt are "0", the level "1" is recorded. Thus, the level of the reproduced signal R(n) is 1. When the level of the signal Zt and the original signal xt is "1" and the level of the signal Yt is "0", the level of the recording signal Xt is "1", in which case the level of the reproduced signal is also 1.

If the level of the signal Yt and the original signal xt is "0" and that of the signal Zt "1", the recording signal has a level "1". Thus the level of the reproduced signal R(n) is 2.

The level of the recording signal Xt is "0" when the levels of the signals Yt and xt are "1" and the level of the signal Zt is "0". Since the intensity of the reflected light from the central track $T_{n-1}$ is three times as large as that of the other tracks, the signal Yt alone produces the signal R(n) of the level 3.

When only the level of the signal Yt is "1" and the levels of the signals Zt and the original signal xt are "0", the level "1" is recorded on the track $T_n$. Accordingly, level of the reproduced signal is 4. The level of the reproduced signal R(n) is 4 when the levels of the signal Xt and Yt are "1" and that of original signal is "0".

When the levels of the signals Zt, Yt and xt are all "1", the recording signal Xt is at the level "1". Hence the level of the reproduced signal R(n) is at maximum, that is 5.

Hence the signals of six levels are produced from the reflected light beam. The determining means 4 produces a low level signal when the level of the signal R(n) is 0, 1, or 4, and a high level signal when the level of the signal R(n) is 1, 3 or 5. Thus the original signal is reproduced.

From the foregoing it will be understood that the present invention provides a method and a system for recording and reproducing an optical medium where the track pitch is small without causing a crosstalk. Thus, a high-density optical medium can be produced. Since the beam spot is focused on two or more tracks, the distance between the tracks can be reduced. A crosstalk which occur when two tracks are read at the same time, need not be cancelled, thereby simplifying the system. Furthermore, the reproduced signal is easily determined from the reflected light beam.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A recording and reproducing method for an optical disc having a plurality of tracks, comprising:
   storing a previous signal recorded on at least one track adjacent to an instant track on which a recording signal is to be recorded;
   performing an exclusive or operation of the stored previous signal and an original signal thereby to produce a recording signal;
   recording the recording signal at a position corresponding to a position where the previous signal is recorded;
   radiating a light beam to the instant track and the adjacent track to form a spot on recorded positions of the previous signal and the recording signal to produce a reproduced signal having a level dependent on conditions of the recorded positions; and
   determining a level of the original signal from the level of the reproduced signal.

2. A recording and reproducing system for an optical disc having a plurality of tracks, comprising:
   means for storing a previous signal recorded on at least one track adjacent to an instant track on which a recording signal is to be recorded;
   means for performing an exclusive or operation of the stored previous signal and an original signal thereby to produce a recording signal;
   means for recording the recording signal at a position corresponding to a position where the previous signal is recorded;
   a pickup for radiating a light beam to the instant track and the adjacent track to form a spot on recorded positions of the previous signal and the recording signal to produce a reproduced signal having a level dependent on conditions of the recorded positions; and
   a determining means for determining a level of the original signal from the level of the reproduced signal.

* * * * *